(12) United States Patent
Kondou et al.

(10) Patent No.: US 11,773,848 B2
(45) Date of Patent: Oct. 3, 2023

(54) CARTRIDGE VANE PUMP AND PUMP DEVICE INCLUDING SAME

(71) Applicant: KYB Corporation, Tokyo (JP)

(72) Inventors: Hirotoshi Kondou, Aichi (JP); Masamichi Sugihara, Gifu (JP)

(73) Assignee: KYB CORPORATION, Tokyo (JP)

( * ) Notice: Subject to any disclaimer, the term of this patent is extended or adjusted under 35 U.S.C. 154(b) by 804 days.

(21) Appl. No.: 16/612,243

(22) PCT Filed: Apr. 24, 2018

(86) PCT No.: PCT/JP2018/016569
§ 371 (c)(1),
(2) Date: Nov. 8, 2019

(87) PCT Pub. No.: WO2018/207611
PCT Pub. Date: Nov. 15, 2018

(65) Prior Publication Data
US 2021/0003129 A1 Jan. 7, 2021

(30) Foreign Application Priority Data
May 11, 2017 (JP) .................................. 2017-094562

(51) Int. Cl.
*F04C 15/00* (2006.01)
*F16J 15/10* (2006.01)
(Continued)

(52) U.S. Cl.
CPC ...... *F04C 15/0015* (2013.01); *F04C 15/0034* (2013.01); *F04B 53/22* (2013.01);
(Continued)

(58) Field of Classification Search
CPC ................ F04C 2/3446; F04C 15/0003; F04C 15/0015; F04C 15/0034; F04C 15/06;
(Continued)

(56) References Cited

U.S. PATENT DOCUMENTS

| 2001/0015232 | A1* | 8/2001 | Seghi ................. F16L 37/008 138/109 |
| 2002/0051721 | A1 | 5/2002 | Ohtaki et al. |

(Continued)

FOREIGN PATENT DOCUMENTS

| DE | 102005033094 A1 * | 1/2007 | .......... F04C 15/0023 |
| DE | 102005033094 A1 | 1/2007 | |

(Continued)

OTHER PUBLICATIONS merriam-webster.com; Taper Definition & Meaning—Merriam-Webster pdf from merriam-webster.com/dictionary/taper (Year: 2022).*
DE102005033094 translation (Year: 2022).*

*Primary Examiner* — Kenneth J Hansen
*Assistant Examiner* — David N Brandt
(74) *Attorney, Agent, or Firm* — Rabin & Berdo, P.C.

(57) ABSTRACT

A cartridge vane pump includes: a side plate brought into contact with first end surfaces of the rotor and the cam ring; a cover brought into contact with second end surfaces of the rotor and the cam ring, the cover attached to the body; and an O-ring provided in an outer circumference of the side plate, the O-ring being configured to seal a gap between the outer circumference of the side plate and an inner circumference of the body. The side plate has: a first flange portion configured to restrict movement of the O-ring towards the rotor side; a second flange portion configured to restrict movement of the O-ring towards an opposite side from the rotor. The first flange portion is formed to be able to compress the O-ring with the body in an axial direction of the driving shaft.

6 Claims, 5 Drawing Sheets

(51) Int. Cl.
  *F16J 15/06* (2006.01)
  *F16J 15/02* (2006.01)
  *F04C 2/344* (2006.01)
  *F04B 53/22* (2006.01)

(52) U.S. Cl.
  CPC .......... *F04C 2/344* (2013.01); *F04C 2230/60* (2013.01); *F04C 2230/70* (2013.01); *F16J 15/021* (2013.01); *F16J 15/062* (2013.01); *F16J 15/10* (2013.01)

(58) Field of Classification Search
  CPC .... F04C 2/344; F04C 2/3441; F04C 15/0007; F04C 2210/206; F04C 2230/60; F04C 2230/70; F04B 53/22; F16J 15/02; F16J 15/021; F16J 15/06; F16J 15/062; F16J 15/10; F16L 23/18; F16L 27/0816
  See application file for complete search history.

(56) References Cited

U.S. PATENT DOCUMENTS

| 2016/0305427 | A1* | 10/2016 | Welte | F04C 2/3446 |
| 2017/0122313 | A1* | 5/2017 | Nishikawa | F04C 2/3446 |
| 2017/0227004 | A1* | 8/2017 | Firzlaff | F04C 15/0023 |

FOREIGN PATENT DOCUMENTS

| JP | 2003-301781 A | 10/2003 |
| JP | 2008111359 A | 5/2008 |

\* cited by examiner

CARTRIDGE VANE PUMP AND PUMP DEVICE INCLUDING SAME

TECHNICAL FIELD

The present invention relates to a cartridge vane pump and a pump device including the same.

BACKGROUND ART

JP2003-301781A discloses a cartridge vane pump that is configured so as to be attachable and detachable to/from a main body portion to be fixed to a base, a frame, and so forth.

SUMMARY OF INVENTION

With such a cartridge vane pump, it is required to bring a side plate, which is provided between a cam ring and a body accommodating the cartridge vane pump, into close contact with the cam ring, thereby preventing leakage of working oil from between the cam ring and the side plate. In order to achieve the above-mentioned object, it is considered to provide a spring between the body and the side plate such that the side plate is biased towards the cam ring.

However, with such a configuration, there is a risk in that the size of the cartridge vane pump and the pump device is increased due to the presence of the spring. In addition, in this case, assembly is performed by arranging the spring in the body, and thereafter, arranging the cartridge vane pump in the body. Therefore, there is a risk in that assemblability of the cartridge vane pump is deteriorated.

An object of the present invention is to, while reducing the size, improve the assemblability of a cartridge vane pump and a pump device including the same.

According to one aspect of the present invention, a cartridge vane pump configured to be accommodated in a body in an attachable and detachable manner, the cartridge vane pump includes a rotor linked to a driving shaft, the rotor being configured to be rotationally driven; a plurality of vanes provided in the rotor so as to be able to reciprocate in a radial direction of the rotor; a cam ring having an inner circumference cam face with which the plurality of vanes are brought into sliding contact; a side member brought into contact with first end surfaces of the rotor and the cam ring; a cover member brought into contact with second end surfaces of the rotor and the cam ring, the cover member being configured to be attached to the body; and a sealing member provided in an outer circumference of the side member, the sealing member being configured to seal a gap between the outer circumference of the side member and an inner circumference of the body, wherein the side member has: a first restricting portion configured to restrict movement of the sealing member towards the rotor side; a second restricting portion configured to restrict movement of the sealing member towards an opposite side from the rotor; and an accommodating space defined by the first restricting portion and the second restricting portion, the sealing member being configured to be accommodated in the accommodating space, and wherein the first restricting portion is formed to have an outer diameter larger than an outer diameter of the second restricting portion so as to be able to compress the sealing member with the body in an axial direction of the driving shaft.

DESCRIPTION OF EMBODIMENTS

An embodiment of the present invention will be described below with reference to the drawings.

A cartridge vane pump (hereinafter, simply referred to as "vane pump") 100 according to the embodiment of the present invention and a pump device 1000 including the same are used as a fluid pressure source for a fluid pressure device mounted on a vehicle, such as, for example, a power steering apparatus, a transmission, and so forth. In the following, an explanation will be given of the vane pump 100 that uses working oil as working fluid. The working fluid is not limited to the working oil, and other working fluid may also be used.

Figure 1:
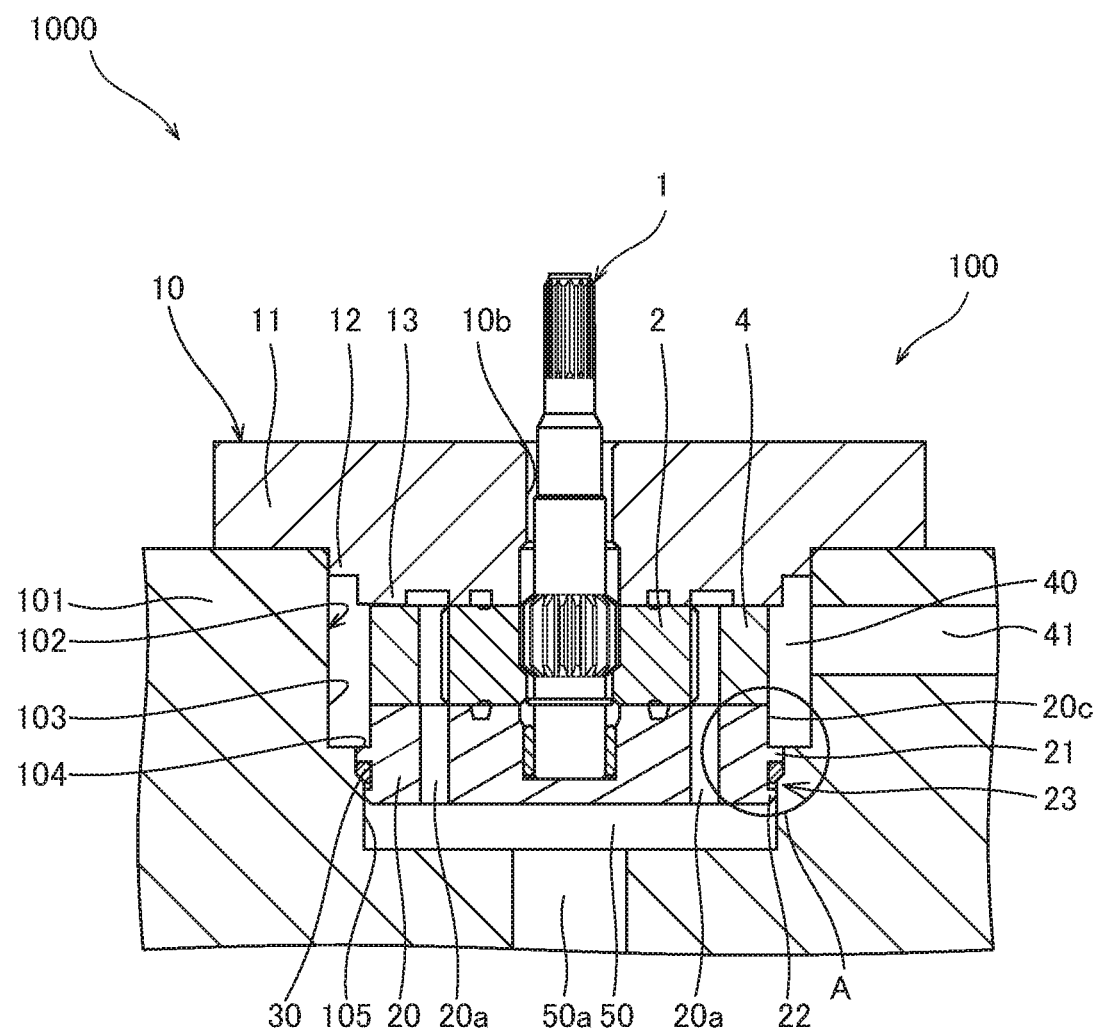
FIG. 1 is a sectional view of a cartridge vane pump according to an embodiment of the present invention.

As shown in FIG. 1, the pump device 1000 includes the vane pump 100 and a body 101 in which an accommodating concave portion 102 for accommodating the vane pump 100 is formed. The body 101 of the pump device 1000 is used as a body of the fluid pressure device in a shared manner.

In an assembled state (a state shown in FIG. 3), the vane pump 100 is accommodated in the accommodating concave portion 102 formed in the body 101 in an attachable and detachable manner. A motive force from an engine (not shown) is transmitted to an end portion of a driving shaft 1, and a rotor 2 linked to the driving shaft 1 is rotated.

Figure 2:
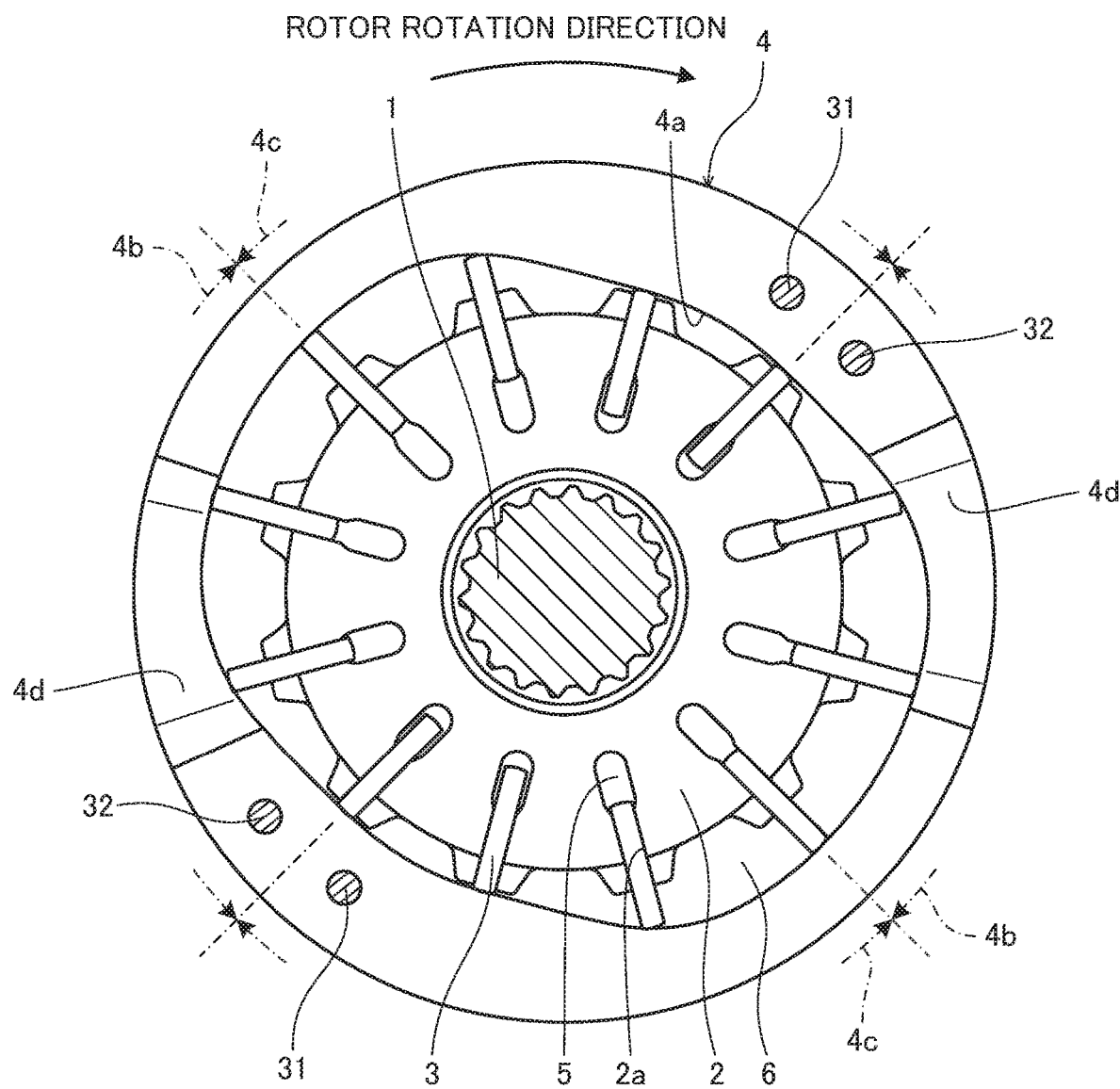
FIG. 2 is a plan view of the cartridge vane pump according to the embodiment of the present invention and shows a state in which a cover is removed.

As shown in FIGS. 1 and 2, the vane pump 100 is provided with the rotor 2 that is rotationally driven by being linked to the driving shaft 1, a plurality of slits 2a that are formed in a radiating pattern so as to open at an outer circumference of the rotor 2, a plurality of vanes 3 that are respectively inserted into the slits 2a in a freely slidable manner so as to be capable of reciprocating in the radial direction of the rotor 2, and a cam ring 4 that accommodates the rotor 2 and that has an inner circumference cam face 4a on which tip end portions of the vanes 3 slide by rotation of the rotor 2.

As shown in FIG. 2, at the base-end side of the slits 2a, back pressure chambers 5 into which discharge pressure from the vane pump 100 is guided are defined. The vanes 3 are pushed by the pressure in the back pressure chambers 5 in the directions in which the vanes 3 are drawn out from the slits 2a, and the tip end portions of the vanes 3 are brought into contact with the inner circumference cam face 4a of the cam ring 4. With such a configuration, a plurality of pump chambers 6 are defined in the cam ring 4 by an outer circumferential surface of the rotor 2, the inner circumference cam face 4a of the cam ring 4, and the adjacent vanes 3.

The cam ring 4 is an annular member whose inner circumference cam face 4a has a substantially oval shape, and the cam ring 4 has suction regions 4b at which the volumes of the pump chambers 6 are expanded as the rotor 2 is rotated and discharge regions 4c at which the volumes of the pump chambers 6 are contracted as the rotor 2 is rotated. The respective pump chambers 6 are expanded/contracted by the rotation of the rotor 2. The vane pump 100 is a so-called balanced vane pump in which the cam ring 4 has two suction regions 4b and two discharge regions 4c. In both end surfaces of the cam ring 4, cut-out portions 4d are formed at the positions corresponding to the two suction regions 4b such that an outside and an inside of the cam ring 4 are communicated therethrough.

As shown in FIG. 1, the vane pump 100 is further provided with a cover (cover member) 10 that is brought into contact with first end surfaces of the rotor 2 and the cam ring 4 (on the upper side in FIG. 1) so as to be attached to the body 101 to close the accommodating concave portion 102 and a side plate 20 serving as a side member that is brought into contact with second end surfaces of the rotor 2 and the cam ring 4 (the lower side in FIG. 1). In this embodiment, the cover member is formed of a single cover 10. The configuration is not limited thereto; a cover-side plate, which is brought into contact with the first end surfaces of the rotor 2 and the cam ring 4, may be provided between the cover 10 and each of rotor 2 and the cam ring 4, and the cover member may be formed of the cover 10 and the cover-side plate.

The cover 10 and the side plate 20 are arranged such that the rotor 2 and the cam ring 4 are held therebetween. Because both end surfaces of the rotor 2 and the cam ring 4 are held between the cover 10 and the side plate 20, the pump chambers 6 are sealed.

Figure 3:
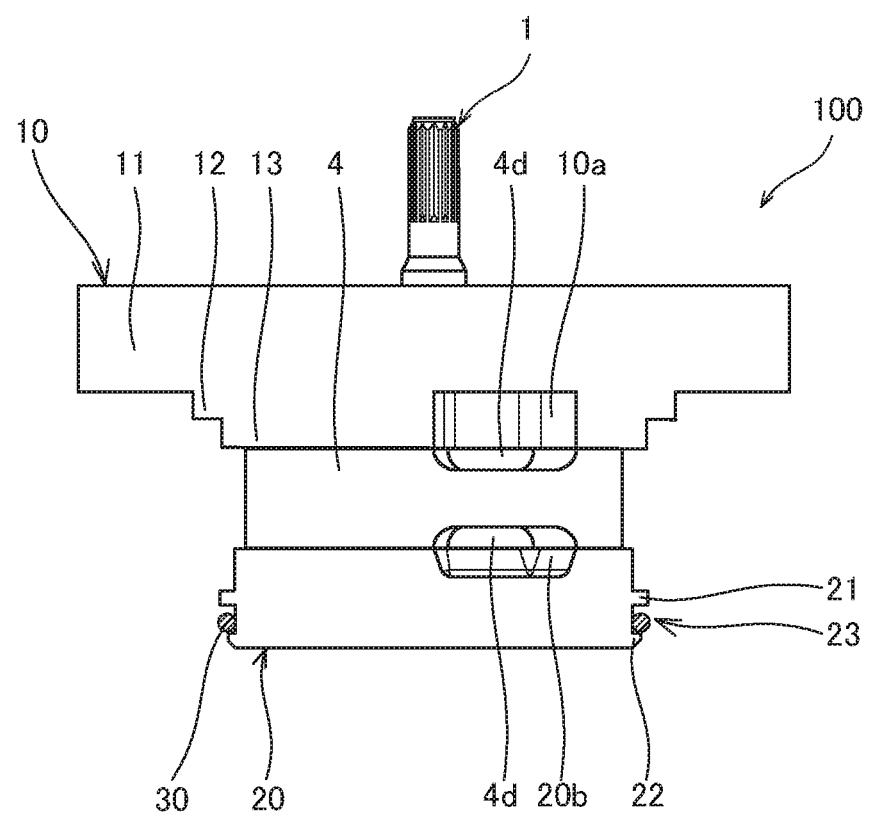
FIG. 3 is a side view of the cartridge vane pump according to the embodiment of the present invention.

As shown in FIGS. 1 and 3, the cover 10 has a closing portion 11 that is brought into contact with an end surface of the body 101 and that closes an opening of the accommodating concave portion 102, an inserted portion 12 that is formed so as to protrude from the closing portion 11 and that is inserted into the accommodating concave portion 102, a contacting portion 13 that is formed so as to protrude from the inserted portion 12 and that is brought into contact with the cam ring 4, suction ports 10a (see FIG. 3) that are formed such that parts of an outer edge portion of the contacting portion 13 are cut away for guiding the working oil into the pump chambers 6, and a through hole 10b into which the driving shaft 1 is inserted.

The suction ports 10a are respectively formed at positions corresponding to the two suction regions 4b. The respective suction ports 10a are formed to have an arc shape centered at the through hole 10b.

The through hole 10b is formed coaxially with the rotation center axis of the rotor 2. The driving shaft 1 is rotatably supported by the cover 10 via a bearing (not shown).

As shown in FIG. 1, in the side plate 20, discharge ports 20a are formed so as to penetrate the side plate 20 in the axial direction such that the pump chambers 6(see FIG. 2) are communicated with a high-pressure chamber 50, which will be described below. The discharge ports 20a are formed at positions corresponding to the two discharge regions 4c. As the rotor 2 is rotated, the working oil in the pump chambers 6 is discharged from the discharge ports 20a.

In addition, also in the side plate 20, suction ports 20b for guiding the working oil into the pump chambers 6 are formed at positions corresponding to the two suction regions 4b (see FIG. 3). The suction ports 20b are formed so as to form cut-out shapes that open at an end surface of the side plate 20 facing the cam ring 4 and at an outer circumferential surface 20c.

Figure 4:
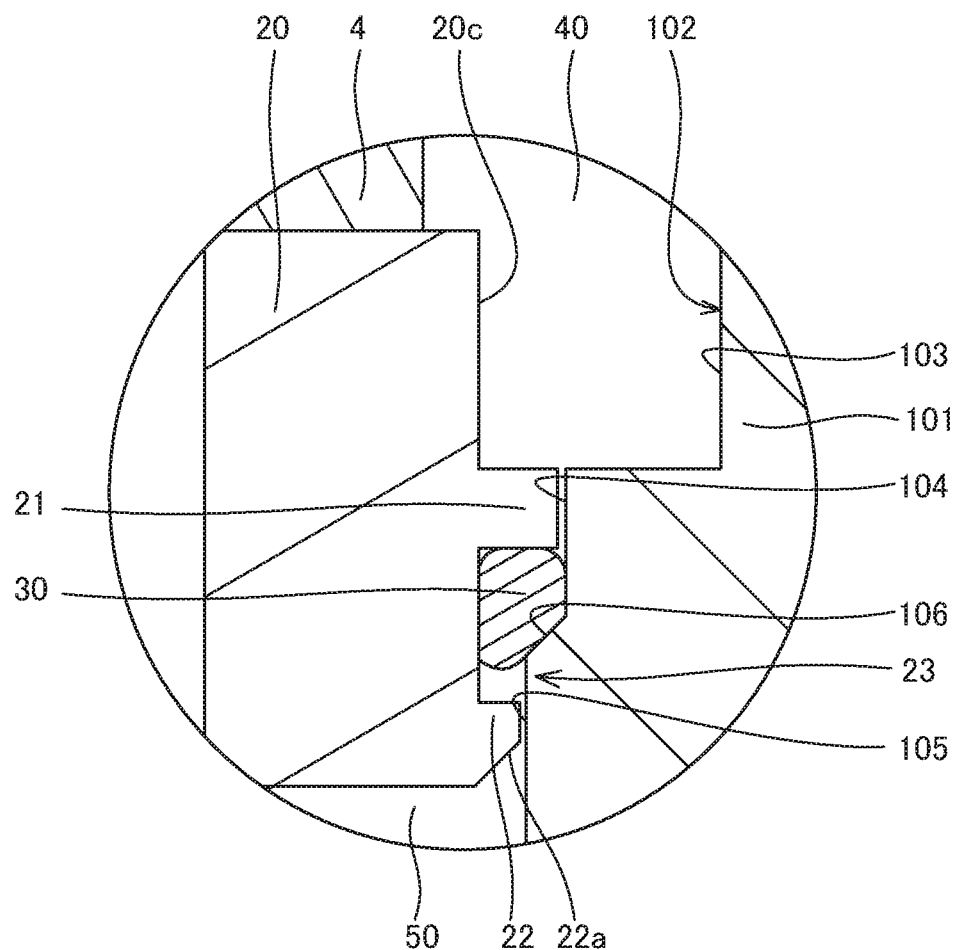
FIG. 4 is an enlarged view of a portion A in FIG. 1.

As shown in FIGS. 1 and 4, an outer circumference of the side plate 20 is provided with an O-ring 30 serving as a sealing member for sealing a gap between the outer circumference of the side plate 20 and an inner circumference of the accommodating concave portion 102 formed in the body 101.

In addition, the side plate 20 has a first flange portion 21 that is formed so as to protrude radially outward from the outer circumferential surface 20c, a second flange portion 22 that is formed so as to protrude radially outward from the outer circumferential surface 20c (see FIG. 3), and an accommodating space 23 that is defined by the first flange portion 21 and the second flange portion 22 so as to accommodate the O-ring 30. The first flange portion 21 serves as a first restricting portion that restricts movement of the O-ring 30 to the rotor 2 side (the upper side in FIG. 1), and the second flange portion 22 serves as a second restricting portion that restricts movement of the O-ring 30 to the opposite side from the rotor 2 (the lower side in FIG. 1). The first flange portion 21 is formed to have an outer diameter larger than that of the second flange portion 22.

The second flange portion 22 has a tapered guide surface 22a that is formed such that the outer diameter is gradually increased towards the accommodating space 23 for guiding insertion of the O-ring 30 into the accommodating space 23 (see FIG. 4). Because the second flange portion 22 has the guide surface 22a, it is possible to easily insert the O-ring 30 into the accommodating space 23 from an end portion of the side plate 20 on the opposite side from the cam ring 4. The shape of the guide surface 22a is not limited to the tapered shape, and it may have other shapes such as a curved shape, for example.

As shown in FIGS. 1 and 4, the accommodating concave portion 102 has an accommodating main body portion 103 that opens at an end surface of the body 101, a first accommodating portion 104 that is formed so as to have an inner diameter smaller than that of the accommodating main body portion 103 and that accommodates the first flange portion 21 of the side plate 20, a second accommodating portion 105 that is formed so as to have an inner diameter smaller than that of the first accommodating portion 104 and that accommodates the second flange portion 22, and a tapered portion 106 that is formed between the first accommodating portion 104 and the second accommodating portion 105 so as to have a tapered surface that is inclined relative to the driving shaft 1.

The inserted portion 12 and the contacting portion 13 of the cover 10, the cam ring 4, the rotor 2, and a part of the side plate 20 on the rotor 2 side are accommodated in the accommodating main body portion 103. A sealing member (not shown) for preventing leakage of the working oil is provided between the accommodating main body portion 103 and the inserted portion 12 of the cover 10.

An inner circumferential surface of the accommodating main body portion 103 faces an outer circumferential surface of the cam ring 4 and the outer circumferential surface 20c of the side plate 20 with a gap therebetween. An annular low pressure chamber (pressure chamber) 40 is formed by the accommodating main body portion 103, the cam ring 4, and the cover 10.

The low pressure chamber 40 is communicated with the pump chambers 6 through the suction ports 10a and 20b of the cover 10 and the side plate 20 (see FIG. 3), and the low pressure chamber 40 is also communicated with a tank (not shown) through a suction passage 41 formed in the body 101. When the vane pump 100 is operated, the working oil in the tank is sucked into the pump chambers 6 through the suction passage 41, the low pressure chamber 40, and the suction ports 10a and 20b.

A bottom surface of the second accommodating portion 105 faces the end surface of the side plate 20 (the lower surface in FIG. 1) with a gap therebetween. The high-pressure chamber 50 is formed by the second accommodating portion 105 and the side plate 20.

The high-pressure chamber 50 is communicated with the pump chambers 6 through the discharge ports 20a, and the high-pressure chamber 50 is also communicated with a discharge passage 50a formed in the body 101. When the vane pump 100 is operated, the working oil in the pump chambers 6 is discharged to the discharge passage 50a through the discharge ports 20a and the high-pressure chamber 50.

The high-pressure chamber 50 is also communicated with the back pressure chambers 5 (see FIG. 2), and the working oil in the high-pressure chamber 50 is guided to the back pressure chambers 5. Therefore, the vanes 3 are biased radially outward not only by the centrifugal force, but also by the pressure in the back pressure chambers 5.

The first flange portion 21 of the side plate 20 is formed to have substantially the same outer diameter as the inner diameter of the first accommodating portion 104 of the accommodating concave portion 102, and the first flange portion 21 fits into the first accommodating portion 104. The second flange portion 22 is formed to have substantially the same the outer diameter as the inner diameter of the second accommodating portion 105 of the accommodating concave portion 102, and the second flange portion 22 fits into the second accommodating portion 105.

As described above, the outer diameter of the first flange portion 21 is larger than the outer diameter of the second flange portion 22, and the inner diameter of the first accommodating portion 104 is larger than the inner diameter of the second accommodating portion 105. There is a difference between the outer diameters of the first flange portion 21 and the second flange portion 22, and correspondingly, there is a difference between the inner diameters of the first accommodating portion 104 and the second accommodating portion 105. Thus, as shown in FIG. 4, in a state in which the cover 10 is attached to the body 101, the second accommodating portion 105 is formed such that an inner circumference thereof is positioned at the inner side of an outer circumference of the first flange portion 21 in the radial direction, and the tapered portion 106 faces the first flange portion 21 such that the O-ring 30 provided in the accommodating space 23 is located therebetween. The O-ring 30 is provided between the tapered portion 106 of the accommodating concave portion 102 in the body 101 and the first flange portion 21 in a compressed state in the axial direction of the driving shaft 1.

With such a configuration, the gap between the side plate 20 and the body 101 is closed. With the O-ring 30, it is possible to prevent flow of the working oil between the low pressure chamber 40 and the high-pressure chamber 50 through this gap.

In addition, because the O-ring 30 is compressed by the tapered portion 106 of the accommodating concave portion 102 between the tapered portion 106 and the first flange portion 21 of the side plate 20 in the axial direction, the side plate 20 is biased upwards in FIGS. 1 and 4 towards the rotor 2 and the cam ring 4 by the reaction force (elastic force). Therefore, the side plate 20 is pressed against the cam ring 4 by the biasing force exerted by the O-ring 30, and it is possible to prevent leakage of the working oil in the pump chambers 6 (see FIG. 2) from between the side plate 20 and the cam ring 4. Especially, even in a case in which the pressing force exerted to the side plate 20 against the cam ring 4 by the pressure of the working oil in the high-pressure chamber 50 is small soon after the vane pump 100 has started, the leakage of the working oil in the pump chambers 6 can be prevented by the biasing force exerted by the O-ring 30. Therefore, it is possible to improve a discharge performance of the vane pump 100.

As described above, the O-ring 30 not only exhibits a function as the sealing member for sealing the gap between the side plate 20 and the body 101, it also functions as a biasing member for pressing the side plate 20 against the cam ring 4. Thus, there is no need to provide other biasing members, such as a spring, etc., and so, it is possible to reduce the overall length thereof to reduce the size. In addition, because the number of parts can be reduced, it is possible to reduce the cost.

In addition, because the O-ring 30 is compressed by the tapered portion 106 having the tapered surface, the O-ring 30 is pressed against the side plate 20 in the axial direction and also in the radial direction. Therefore, it is possible to seal the gap between the outer circumference of the side plate 20 and an inner circumference of the body 101 with a higher reliability by biasing the side plate 20 towards the cam ring 4 by the O-ring 30 and by pressing the O-ring 30 against the outer circumferential surface 20c of the side plate 20. With such a configuration, it is possible to improve the sealing performance between the side plate 20 and the body 101. By adjusting the taper angle of the tapered portion 106, it is possible to adjust a balance between the pressing force exerted by the O-ring 30 against the first flange portion 21 (in other words, the biasing force exerted to the side plate 20 towards the cam ring 4) and the pressing force exerted to the O-ring 30 against the outer circumferential surface 20c of the side plate 20 (in other words, the sealing performance between the side plate 20 and the body 101).

Next, a method of assembling the vane pump 100 and the pump device 1000 will be described.

Figure 5:
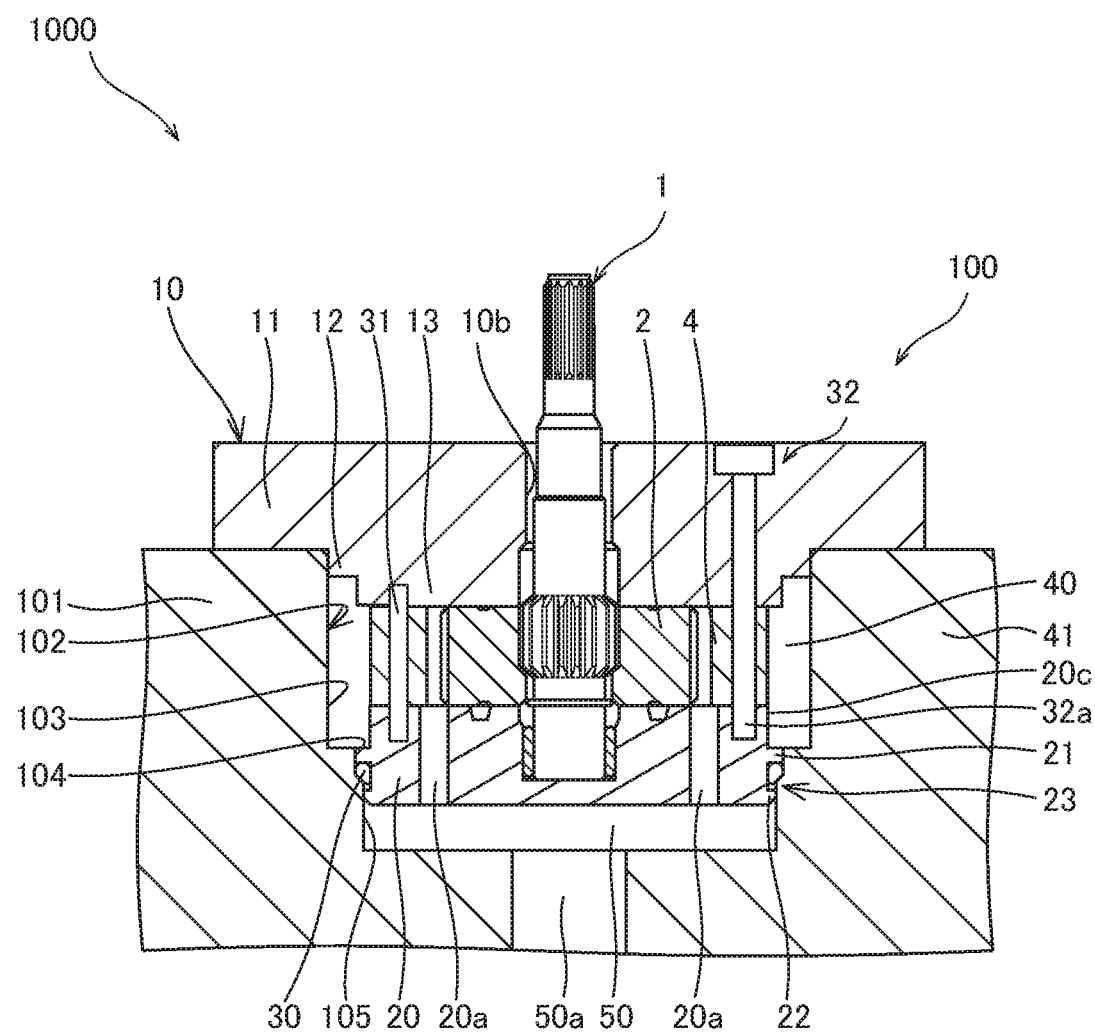
FIG. 5 is a sectional view of the cartridge vane pump according to the embodiment of the present invention and shows a different cross-section from that shown in FIG. 1.

Dowel pins 31 are first press-fitted into the cover 10 (see FIGS. 2 and 5). After the dowel pins 31 are inserted into the cam ring 4, the dowel pins 31 are also inserted into the side plate 20. By doing so, a state in which the cover 10, the cam ring 4, are the side plate 20 are stacked is achieved. Here, the driving shaft 1, the rotor 2, and the vanes 3 are assembled inside the cam ring 4 when the cam ring 4 is to be inserted. As described above, the dowel pins 31 penetrate through the cam ring 4, and both ends thereof are supported by the cover 10 and the side plate 20, and thereby, relative rotation of the cover 10 and the side plate 20 with respect to the cam ring 4 is prevented. In other words, the dowel pins 31 not only function as positioning parts for these members during the assembly, but also function as rotation stoppers for preventing the relative rotation of the cover 10 and the side plate 20 with respect to the cam ring 4 after the assembly.

Next, two head pins 32 serving as linking members are inserted into the cover 10, the cam ring 4, and the side plate 20 that have been stacked in this order, and thereby, these members are integrally held by the head pins 32. Specifically, tip ends 32a of the head pins 32 are press-fitted into the side plate 20. By doing so, the cover 10, the cam ring 4, and the side plate 20 are integrated by the head pins 32. In FIG. 5, for the sake of convenience of description, single dowel pin 31 and single head pin 32 are illustrated in the same plane. In addition, the head pins 32 are not limited to those press-fitted into the side plate 20. For example, the tip ends 32a may be threaded, and the cover 10, the cam ring 4, and the side plate 20 may be integrated by screwing the head pins 32 into the side plate 20.

Next, the O-ring 30 is accommodated into the accommodating space 23 from the end portion of the side plate 20. At this time, the insertion of the O-ring 30 into the accommodating space 23 is guided by the guide surface 22a of the side plate 20. Thus, it is possible to attach the O-ring 30 to the side plate 20 with ease. The O-ring 30 accommodated in the accommodating space 23 is prevented from being dismounted by the second flange portion 22. Thus, the O-ring 30 is held integrally to the side plate 20. As described above, the vane pump 100 is assembled.

Next, the vane pump 100 that has been assembled as described above is accommodated in the accommodating concave portion 102 of the body 101. At this time, the vane pump 100 is accommodated such that the second flange portion 22 of the side plate 20 is fitted to the second accommodating portion 105 of the accommodating concave portion 102 and such that the first flange portion 21 is fitted to the first accommodating portion 104. The O-ring 30 is then compressed in the axial direction by the first flange portion 21 of the side plate 20 and the tapered portion 106 of the accommodating concave portion 102 in the body 101. In this state, the cover 10 is fixed to the body 101 with bolts (not shown). By doing so, the side plate 20 is pressed against the cam ring 4 by the biasing force exerted by the O-ring 30.

As described above, with the cartridge vane pump 100, even in a case in which only the cover 10 is lifted up in a state in which the cover 10 is not attached to the body 101, separation of the rotor 2, the vanes 3, the cam ring 4, and the side plate 20 from the cover 10 is prevented, and they are configured in the integrated state. Therefore, it is possible to attach the vane pump 100 to the body 101 by moving the respective members in the integrated state at once, and thereby, it is possible to improve the assemblability of the vane pump 100.

Even when the vane pump 100 is to be detached from the body 101, only by moving the cover 10 away from the body 101, it is possible to take out the rotor 2, the vanes 3, the cam ring 4, and the side plate 20 from the accommodating concave portion 102. Therefore, it is possible to detach the vane pump 100 from the body 101 with ease.

In a case in which the side plate is to be pressed against the cam ring by other biasing members such as the spring, etc. in the cartridge vane pump, in which respective members are integrated, the spring is accommodated in an accommodating concave portion first, the vane pump is then accommodated in the accommodating concave portion, and thereby, the vane pump is assembled to the body. In such a case, because assembly steps such as alignment of the body and the vane pump with the spring is required, for example, the number of the assembly steps is increased, and the assemblability of the vane pump is deteriorated.

In contrast, in this embodiment, the movement of the O-ring 30, which is provided in the accommodating space 23 of the side plate 20 and that biases the side plate 20, towards the opposite side from the rotor 2 is restricted by the second flange portion 22, and thereby, the O-ring 30 is prevented from being dismounted from the accommodating space 23. Thus, it is possible to insert the entire vane pump 100 into the accommodating concave portion 102 in a state in which the O-ring 30 is accommodated in the accommodating space 23 and the O-ring 30 is integrated with the vane pump 100. As described above, with the vane pump 100, because the O-ring 30 is integrated by being held on the side plate 20, attachment to the body 101 can be performed at once, and so, it is not necessarily to perform alignment, etc. Therefore, it is possible to press the side plate 20 against the cam ring 4 by the O-ring 30 while improving the assemblability.

Next, a modification of this embodiment will be described.

In the above-mentioned embodiment, the first restricting portion is the first flange portion 21 that protrudes radially outward from the outer circumferential surface 20c of the side plate 20, and the second restricting portion is the second flange portion 22 that protrudes radially outward from the outer circumferential surface 20c of the side plate 20. However, the configuration is not limited thereto; the O-ring 30 may be compressed in the axial direction between the first restricting portion and the body 101, and the second restricting portion may take any shape so long as the compression of the O-ring 30 by the first restricting portion and the body 101 is not disturbed and the dismount of the O-ring 30 is prevented.

In addition, in the above-mentioned embodiment, a step portion is formed between the first accommodating portion 104 and the second accommodating portion 105 of the accommodating concave portion 102 as the tapered portion 106 having a tapered surface. In contrast, as long as the O-ring 30 can be compressed by the first flange portion 21 and the step portion between the first accommodating portion 104 and the second accommodating portion 105, the step portion may be formed to have other shapes than the tapered portion 106, such as, for example, a curved surface, a flat surface perpendicular to the driving shaft 1, and so forth. In addition, the step portion may be formed to have a shape formed by appropriately combining a tapered surface, a curved surface, and a flat surface.

According to the embodiment mentioned above, the advantages described below are afforded.

In the vane pump 100, because the O-ring 30 is compressed in the axial direction between the first flange portion 21 of the side plate 20 and the tapered portion 106 of the body 101, the side plate 20 is biased towards the rotor 2 and the cam ring 4 by the reaction force (elastic force). Therefore, the side plate 20 is pressed against the cam ring 4 by the biasing force exerted by the O-ring 30, and so, it is possible to prevent leakage of the working oil in the pump chambers 6 from between the side plate 20 and the cam ring 4. Especially, even in a case in which the pressing force exerted to the side plate 20 against the cam ring 4 by the pressure of the working oil in the high-pressure chamber 50 is small, the leakage of the working oil in the pump chambers 6 can be prevented by the biasing force exerted by the O-ring 30. Therefore, it is possible to improve the discharge performance of the vane pump 100.

In addition, the O-ring 30 is integrally configured with the vane pump 100 so as to be prevented from being dismounted from the accommodating space 23 by the second flange portion 22 of the side plate 20. Therefore, as described above, the O-ring 30 not only exhibits a function as the sealing member for sealing the gap between the side plate 20 and the body 101, it also functions as the biasing member for pressing the side plate 20 against the cam ring 4. Thus, there is no need to provide other biasing members, such as the spring, etc., and so, it is possible to reduce the overall length thereof to reduce the size. In addition, because the number of parts can be reduced, it is possible to reduce the cost.

In addition, in this embodiment, the movement of the O-ring 30 towards the opposite side from the rotor 2 is restricted by the second flange portion 22, and thereby, the O-ring 30 is prevented from being dismounted from the accommodating space 23. Thus, because the vane pump 100 can be attached to the body 101 in a state in which the O-ring 30 is held on the side plate 20, it is possible to press the side plate 20 against the cam ring 4 by the O-ring 30 while improving the assemblability.

In addition, in this embodiment, because the O-ring 30 is compressed by the tapered portion 106 having the tapered surface, the O-ring 30 is pushed in the axial direction such that the side plate 20 is pressed against the cam ring 4, and at the same time, the O-ring 30 is pushed in the radial direction to the outer circumferential surface 20*c* of the side plate 20. Thus, it is possible to press the side plate 20 against the cam ring 4 and to improve the sealing performance between the side plate 20 and the body 101.

Configurations, operations, and effects of the embodiment according to the present invention will be collectively described below.

The vane pump 100 accommodated in the body 101 in an attachable and detachable manner includes: the rotor 2 linked to the driving shaft 1, the rotor 2 being configured to be rotationally driven; the plurality of vanes 3 provided in the rotor 2 so as to be able to reciprocate in the radial direction of the rotor 2; the cam ring 4 having the inner circumference cam face 4*a* with which the plurality of vanes 3 are brought into sliding contact; the side plate 20 brought into contact with the first end surfaces of the rotor 2 and the cam ring 4; the cover 10 brought into contact with the second end surfaces of the rotor 2 and the cam ring 4, the cover 10 being attached to the body 101; and the O-ring 30 provided in the outer circumference of the side plate 20, the O-ring 30 being configured to seal the gap between the outer circumference of the side plate 20 and the inner circumference of the body 101, wherein the side plate 20 has: the first flange portion 21 configured to restrict the movement of the O-ring 30 towards the rotor side; the second flange portion 22 configured to restrict the movement of the O-ring 30 towards the opposite side form the rotor 2; and the accommodating space 23 defined by the first flange portion 21 and the second flange portion 22, the O-ring 30 being configured to be accommodated in the accommodating space 23, and wherein the first flange portion 21 is formed to have the outer diameter larger than the outer diameter of the second flange portion 22 so as to be able to compress the O-ring 30 with the body 101 in the axial direction of the driving shaft 1.

With such a configuration, although the second flange portion 22 is formed to have the outer diameter smaller than that of the first flange portion 21 and a difference in the outer diameter is caused between them, the second flange portion 22 restricts the movement of the O-ring 30, which is provided in the outer circumference of the side plate 20, towards the anti-rotor side. Thus, while the dismount of the O-ring 30 from the accommodating space 23 is prevented, because a part of the body 101 (the tapered portion 106) is formed so as to face the first flange portion 21 such that the O-ring 30 is sandwiched therebetween at the inner side of the outer circumference of the first flange portion 21 in the radial direction, it is possible to compress the O-ring 30 in the axial direction between the part of the body 101 and the first flange portion 21. As the O-ring 30 is compressed in the driving shaft direction by the first flange portion 21 of the side plate 20 and the body 101, the biasing force is exerted to the side plate 20 by the O-ring 30 in the direction towards the cam ring 4. Thus, the O-ring 30 sealing the gap between the side plate 20 and the body 101 also functions as the biasing member that presses the side plate 20 against the cam ring 4, and so, there is no need to separately provide the biasing member, such as the spring, etc. In addition, because the dismount of the O-ring 30 is prevented by the second flange portion 22, it is possible to assemble the vane pump 100 to the body 101 as a unit by keeping the O-ring 30 held on the side plate 20. Therefore, the size of the vane pump 100 and the pump device 1000 is reduced, and at the same time, the assemblability is improved.

In addition, in the vane pump 100, the second flange portion 22 has the guide surface 22*a* configured to guide the insertion of the O-ring 30 into the accommodating space 23, the guide surface 22*a* being formed such that the outer diameter is gradually increased towards the accommodating space 23.

With such a configuration, the O-ring 30 can be accommodated into the accommodating space 23 with ease by being guided by the guide surface 22*a*.

In addition, the pump device 1000 includes: the above-described the vane pump 100; and the body 101 having the accommodating concave portion 102 configured to accommodate the vane pump 100, wherein the accommodating concave portion 102 has: the first accommodating portion 104 configured to accommodate the first flange portion 21; the second accommodating portion 105 formed to have the inner diameter smaller than the inner diameter of the first accommodating portion 104, the second accommodating portion 105 being configured to accommodate the second flange portion 22; and the tapered portion 106 formed between the first accommodating portion 104 and the second accommodating portion 105 so as to have the tapered surface inclined with respect to the driving shaft 1, the O-ring 30 being configured to be compressed in an axial direction between the tapered portion 106 and the first flange portion 21.

According to this configuration, because the O-ring 30 is compressed by the tapered portion 106 having the tapered surface, the O-ring 30 is pressed against the side plate 20 in the axial direction and also in the radial direction. Thus, the biasing force is exerted to the side plate 20 towards the cam ring 4 and the gap between the outer circumference of the side plate 20 and the inner circumference of the body 101 is sealed with a higher reliability, and thereby, it is possible to improve the sealing performance.

Embodiments of this invention were described above, but the above embodiments are merely examples of applications of this invention, and the technical scope of this invention is not limited to the specific constitutions of the above embodiments.

This application claims priority based on Japanese Patent Application No.2017-94562 filed with the Japan Patent Office on May 11, 2017, the entire contents of which are incorporated into this specification.

The invention claimed is:

1. A cartridge vane pump configured to be accommodated in a body in an attachable and detachable manner, the cartridge vane pump comprising: a rotor linked to a driving shaft, the rotor being configured to be rotationally driven; a plurality of vanes provided in the rotor so as to be reciprocable in a radial direction of the rotor; a cam ring having an inner circumferential cam surface with which the plurality of vanes are brought into sliding contact with rotation of the rotor; a plurality of pump chambers provided in the cam ring, between an outer circumferential surface of the rotor and the inner circumferential cam surface of the cam ring, each of the plurality of pump chambers being defined by an adjacent two of the plurality of vanes; a side member having a first end surface that abuts on first end surfaces of the rotor and the cam ring; a cover member abutting on second end surfaces of the rotor and the cam ring, the cover member being configured to be attached to the body; and a sealing member provided in an outer circumferential surface of the side member, the sealing member being configured to seal a gap between the outer circumferential surface of the side member and an inner circumferential surface of the body, wherein the side member includes: a suction port for guiding a working fluid into the pump chambers, the suction port opening extending through the first end surface of the side member and the outer circumferential surface of the side member; a first restricting portion configured to restrict movement of the sealing member towards a first side of the side member where the rotor is disposed; a second restricting portion configured to restrict movement of the sealing member towards a second side opposite to the first side of the side member; and an accommodating space defined by the first restricting portion and the second restricting portion, the sealing member being accommodated in the accommodating space, and wherein the first restricting portion has a flange protruding radially outward from the outer circumferential surface of the side member, the flange having an outer diameter that is larger than an outer diameter of the second restricting portion so as to be able to compress the sealing member with the body in an axial direction of the driving shaft when the cartridge vane pump is accommodated in the body.

2. The cartridge vane pump according to claim 1, wherein the second restricting portion has a guide surface configured to guide insertion of the sealing member into the accommodating space, the guide surface being formed such that an outer diameter thereof gradually increases towards the accommodating space.

3. A pump device comprising:
the cartridge vane pump and the body according to claim 1, wherein
the body has an accommodating concave portion accommodating the cartridge vane pump, and
the accommodating concave portion has:
a first accommodating portion accommodating the first restricting portion;
a second accommodating portion having an inner diameter that is smaller than an inner diameter of the first accommodating portion, the second accommodating portion accommodating the second restricting portion; and
a tapered portion formed between the first accommodating portion and the second accommodating portion so as to have a tapered surface inclined with respect to the driving shaft, the sealing member being compressed in the axial direction between the tapered portion and the first restricting portion.

4. The pump device according to claim 3, further comprising: a first pressure chamber provided between an inner surface of the accommodating concave portion and an outer circumferential surface of the cam ring; and a second pressure chamber provided between a bottom of the accommodating concave portion body and a second end surface of the side member opposite to the first end surface of the side member, the suction port connecting the pump chambers to the first pressure chamber, wherein the sealing member is provided such that the working fluid does not flow through the gap between the outer circumferential surface of the side member and the inner circumferential surface of the body.

5. The cartridge vane pump according to claim 1, wherein:
the cam ring forms a first pressure chamber between an outer circumferential surface of the cam ring and an inner surface of the body when the cartridge vane pump is accommodated in the body, the suction port connecting the pump chambers to the first pressure chamber, the side member forms a second pressure chamber between a second end surface of the side member opposite to the first end surface of the side member and the body when the cartridge vane pump is accommodated in the body, and the sealing member is provided such that the working fluid does not flow through the gap between the outer circumferential surface of the side member and the inner circumferential surface of the body.

6. A pump device comprising: a cartridge vane pump; and a body attachably and detachably accommodating the cartridge vane pump, wherein the cartridge vane pump includes: a rotor linked to a driving shaft, the rotor being configured to be rotationally driven; a plurality of vanes provided in the rotor so as to be reciprocable in a radial direction of the rotor; a cam ring having an inner circumferential cam surface with which the plurality of vanes are brought into sliding contact with rotation of the rotor; a plurality of pump chambers provided in the cam ring, between an outer circumferential surface of the rotor and the inner circumferential cam surface of the cam ring, each of the plurality of pump chambers being defined by an adjacent two of the plurality of vanes; a side member having a first end surface that abuts on first end surfaces of the rotor and the cam ring; a cover member abutting on second end surfaces of the rotor and the cam ring, the cover member being attached to the body; a first pressure chamber provided between the body and the cam ring; a second pressure chamber provided between the body and the side member; and a sealing member provided on an outer circumferential surface of the side member, between the first pressure chamber and the second pressure chamber, the sealing member sealing a gap between the outer circumferential surface of the side member and an inner circumferential surface of the body so that a working fluid does not flow between the first pressure chamber and the second pressure chamber through the gap, and the side member includes: a suction port for guiding the working fluid into the pump chambers, the suction port extending through the first end surface of the side member and the outer circumferential surface of the side member and connecting the pump chambers to the first pressure chamber; a first restricting portion configured to restrict movement of the sealing member towards a first side of the side member where the rotor is disposed; a second restricting portion configured to restrict movement of the sealing member towards a second side opposite to the first side of the side member; and an accommodating space defined by the first restricting portion and the second restricting portion, the sealing member being accommodated in the accommodating space, and the first restricting portion has a flange protruding radially outward from the outer circumferential surface of the side member, the flange having an outer diameter that is larger than an outer diameter of the second restricting portion so as to compress the sealing member with the body in an axial direction of the driving shaft.

* * * * *